United States Patent [19]

Gigou

[11] 4,366,113

[45] Dec. 28, 1982

[54] INSTALLATION FOR A NUCLEAR POWER STATION WITH STAGGERED SWIMMING POOLS

[75] Inventor: Roger Gigou, Herblay, France

[73] Assignee: Framatome, Courbevoie, France

[21] Appl. No.: 199,109

[22] Filed: Oct. 20, 1980

Related U.S. Application Data

[63] Continuation of Ser. No. 947,829, Oct. 2, 1978, abandoned.

[30] Foreign Application Priority Data

Oct. 4, 1977 [FR] France ............................ 77 29845

[51] Int. Cl.³ ............................................ G21C 19/00
[52] U.S. Cl. .................................. 376/264; 376/270;
376/272; 376/403
[58] Field of Search ............... 376/264, 268, 270, 272, 376/203, 403; 414/146

[56] References Cited

U.S. PATENT DOCUMENTS

| | | | |
|---|---|---|---|
| 3,143,479 | 8/1964 | Hargo | 376/264 |
| 3,206,366 | 9/1965 | Bosshard | 376/264 |
| 3,271,262 | 9/1966 | Hutchinson | 376/264 |
| 3,915,792 | 10/1975 | Aubert | 376/270 |
| 3,952,885 | 4/1976 | Schabert | 376/264 |
| 4,202,729 | 5/1980 | Allain | 376/270 |

*Primary Examiner*—Donald P. Walsh
*Attorney, Agent, or Firm*—Pollock, Vande Sande & Priddy

[57] ABSTRACT

In an installation for a nuclear power station comprising a "reactor building" with a first swimming pool for handling of fuel units and a fuel building with a second swimming pool for the transfer, storage and deactivation of the units, the second swimming pool is located at a lower level than that of the first and is connected to the first by an intermediate auxiliary chamber filled with water and located under the first swimming pool. The auxiliary chamber is connected by a vertical pipeline to the first swimming pool and by a horizontal connecting pipeline to the second swimming pool. Each of the pipelines is provided with a shut-off valve, with interlocking means which prevents the simultaneous opening of the two valves. There is negligible dead space around a conveyor basket for fuel units when it is in the vertical or horizontal pipelines.

1 Claim, 6 Drawing Figures

FIG 5
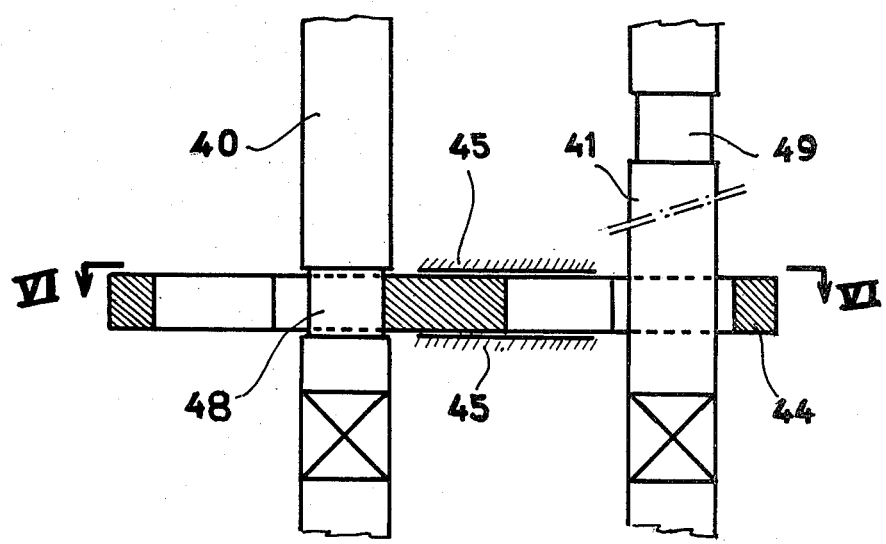
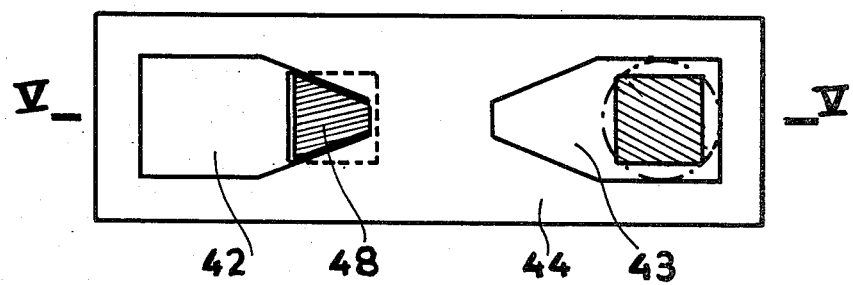
FIG 6

INSTALLATION FOR A NUCLEAR POWER STATION WITH STAGGERED SWIMMING POOLS

This is a continuation of application Ser. No. 947,829 filed Oct. 2, 1978 now abandoned.

The present invention relates to an installation for a nuclear power station and more particularly to the arrangement of the swimming pools for the handling, storage and deactivation of the fuel units.

In a nuclear power station and in particular in a power station employing water under pressure, the reactor core, at the center of the building referred to as the "reactor building" and forming the confining chamber, is surmounted by a swimming pool for the handling of the fuel units. During the operations of charging or discharging, the cover of the reactor is removed and the reactor vessel is flush with the bottom of a reservoir or "swimming pool" filled with water containing boric acid. All the handling operations of the fuel units are thus carried out under a thick layer of water which provides both biological protection against radiation, and an efficient means of cooling for the removal of the residual heat. The spent units, extracted vertically from the core of the reactor vessel of the reactor, are then swivelled into a horizontal position and placed on a carriage to transfer them to an adjoining building referred to as the "fuel building". This transfer is effected through a completely immersed horizontal transfer tube which connects the swimming pool of the reactor building to another swimming pool located in the fuel building. In this second swimming pool the unit is set upright and, whilst still immersed, is placed on storage racks for a deactivation period. After sufficient deactivation, the unit is introduced into a container for transporting it to a reprocessing factory. The operation of charging the container for transport is carried out under the biological protection afforded by a sealed envelope referred to as a "lead castle".

The reverse path, from the storage in the swimming pool of the fuel building to the swimming pool of the reactor building and then to the reactor is used for the fresh fuel units to be inserted into the reactor.

The swimming pool of the reactor building, which is necessarily above the reactor vessel, is thus at a relatively high level and, in the currently used installations having a direct horizontal passage, the swimming pool of the fuel building, which constitutes a heavy weight, is necessarily at the same level. This thus entails the disadvantage that the adjoining building, of relatively low ground area, must be of great height, that is to say it increases the surface of the building exposed to the impact of projectiles and its sensitivity to the consequences of an earthquake. This also makes it more difficult to provide the protection also referred to as "bunkerization" of the building against vertically falling projectiles, because the concrete masses which must be employed at high levels further increase the dangers due to earthquakes and make it necessary to use extremely expensive foundations.

Furthermore, safety regulations provide maximum admissible fall heights for the handling operations in the "lead castle" during removal of the spent and deactivated units from the transport container. Transfer from a deactivation swimming pool located at a high level thus demands stepwise handling and hence additional constraints in the operation of the power station.

The invention, which overcomes these disadvantages, provides a solution which substantially reduces the civil engineering expenditure entailed in the whole of the concrete structures of the building, whilst facilitating its "bunkerization" and improving the safety of the handling operations involved in the removal of the deactivated units.

According to the invention there is provided an installation for a nuclear power station comprising:
a building containing a nuclear reactor surmounted by a first swimming pool for handling fuel units under water;
an adjoining building with a second swimming pool for the transfer of the fresh fuel units and for the storage and deactivation of the spent fuel units, the bottom of said second swimming pool being at the same level as the base of said reactor building;
an intermediate chamber in said reactor building, said chamber being entirely and permanently filled with water;
a horizontal pipeline and a vertical pipeline permanently filled with water, for the passage of the fuel units therethrough, and both opening into said intermediate chamber, said vertical pipeline communicating with said first swimming pool, and said horizontal pipeline communicating with said second swimming pool;
a leakproof shut-off valve for each pipeline and
interlocked control means for said valves such that said two valves cannot both be in open condition at the same time.

The invention will now be described in greater detail with reference to a particular embodiment thereof, given by way of example only, with reference to the accompanying drawings. In the drawings:

FIGS. 5 and 6 schematically show a device for the mechanical interlocking of the controls of the two valves, FIG. 5 being a vertical cross-section along the line V—V of FIG. 6 and FIG. 6 being a cross-section along the line VI—VI of FIG. 5.

Figure 1:
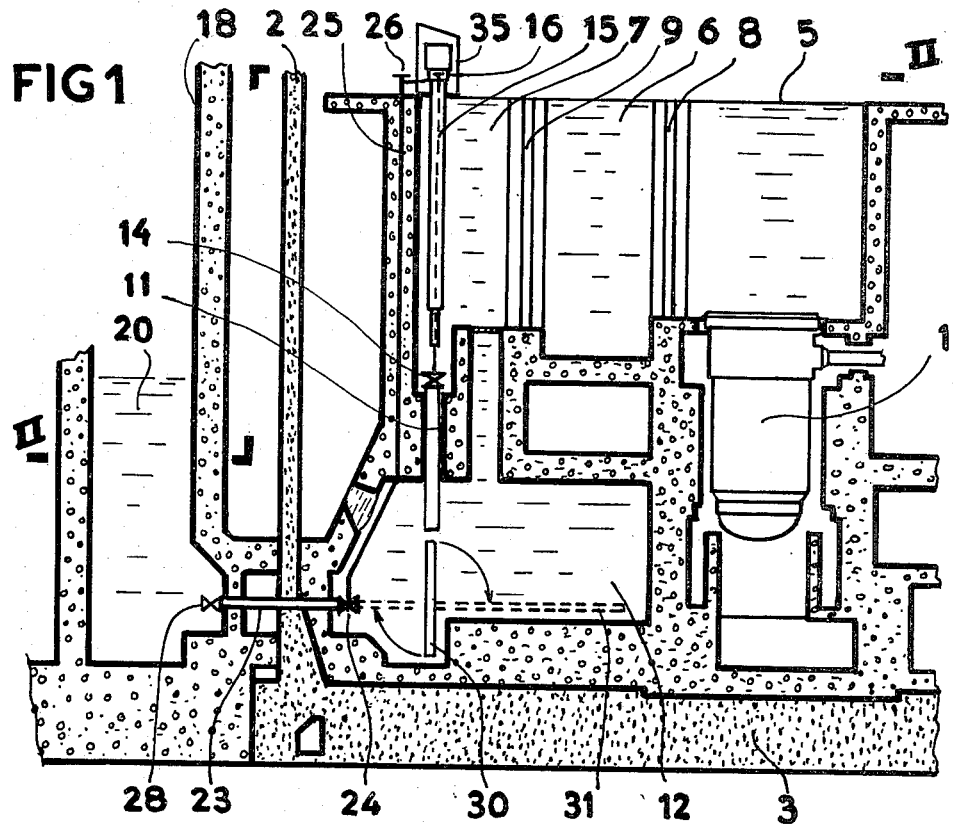
FIG. 1 is a partial cross-section, along the line I—I of FIG. 2, of the "reactor building" of a nuclear power station installation according to the present invention, and of the adjacent "fuel building" and shows the first stage of the transfer of a fuel unit from the reactor building to the fuel building.
Figure 2:
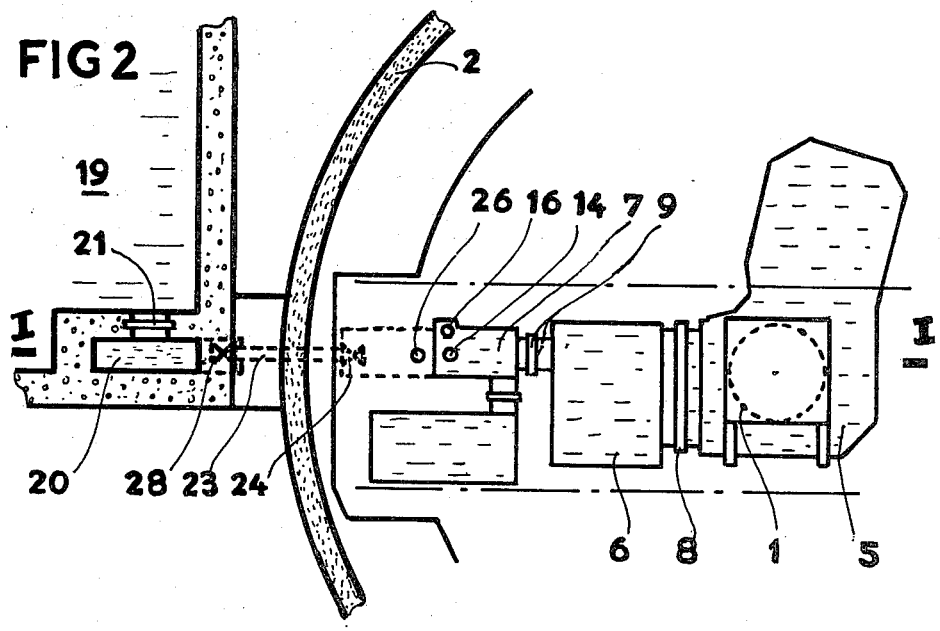
FIG. 2 is a horizontal cross-section along the line II—II of FIG. 1.

Reference will first of all be made to FIGS. 1 and 2, which show the reactor vessel 1, at the center of the "reactor building", of which the side walls 2 and the floor 3 form a confining chamber. The upper part of the vessel 1, with its cover removed as shown in FIG. 1, is flush with the lower part of a swimming pool comprising, in the present embodiment three chambers 5, 6 and 7, which can be isolated by means of coffers 8 and 9. The chamber 7, or removal compartment, communicates by means of a vertical chimney 11 with a lower chamber 12 referred to as the "swivel compartment". The chimney 11 can be closed in a leak-tight manner by means of a valve 14, the control of which is linked, by a set of control connecting rods 15, to an operation station 16 located on the service floor above the swimming pool.

The "fuel building" 18, which serves to store and deactivate the fuel units, also possesses a swimming pool 19 for handling and storage, with a swivel compartment 20 which can be isolated by means of a coffer 21. The swivel compartments 12 and 20, respectively in the reactor building and in the fuel building, communicate with one another through a horizontal transfer tube 23. On the reactor building side the tube 23 can be isolated by means of a leakproof shut-off valve 24, the control of which is transmitted by means of a set of connecting rods 25 to an operation station 26 located on the service floor above the swimming pool of the reactor building and near the operating station 16 which controls the valve 14; the other end of the transfer tube 23, namely the end on the fuel building side, is also provided with a safety valve 28 which is normally open.

In FIG. 1 there is shown, very schematically, an entirely conventional device referred to as a "swivel and conveyor basket" 30. A device of this type is described, for example, in French Pat. No. 74/21,838 published under U.S. Pat. No. 2,234,637. This device, which is used in known installations, makes it possible to receive a unit in its vertical position and to bring it to a horizontal position, and then to move it longitudinally in the horizontal direction.

Figure 3:
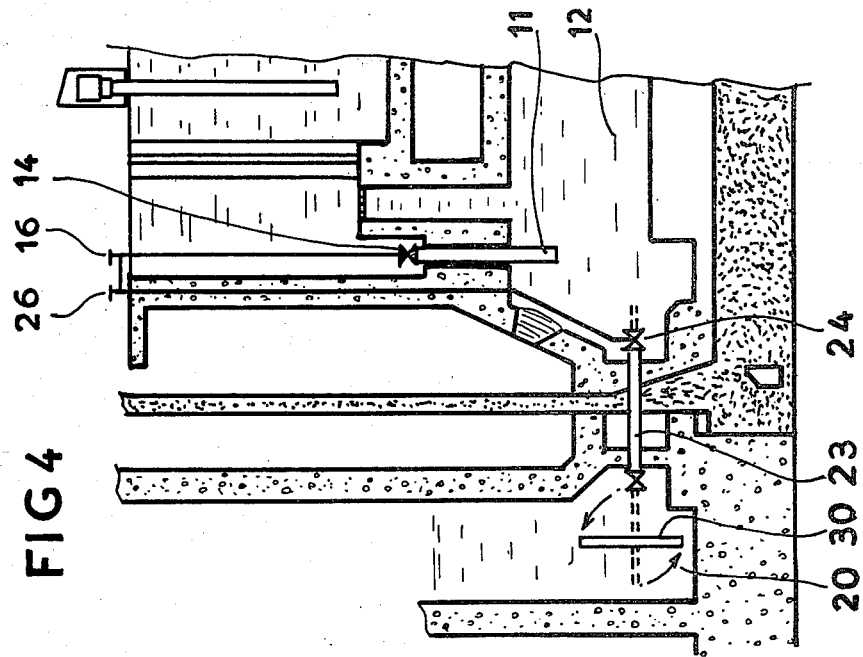
FIGS. 3 and 4 are figures similar to FIG. 1 and respectively represent two other successive stages of the transfer of a unit.
Figure 4:
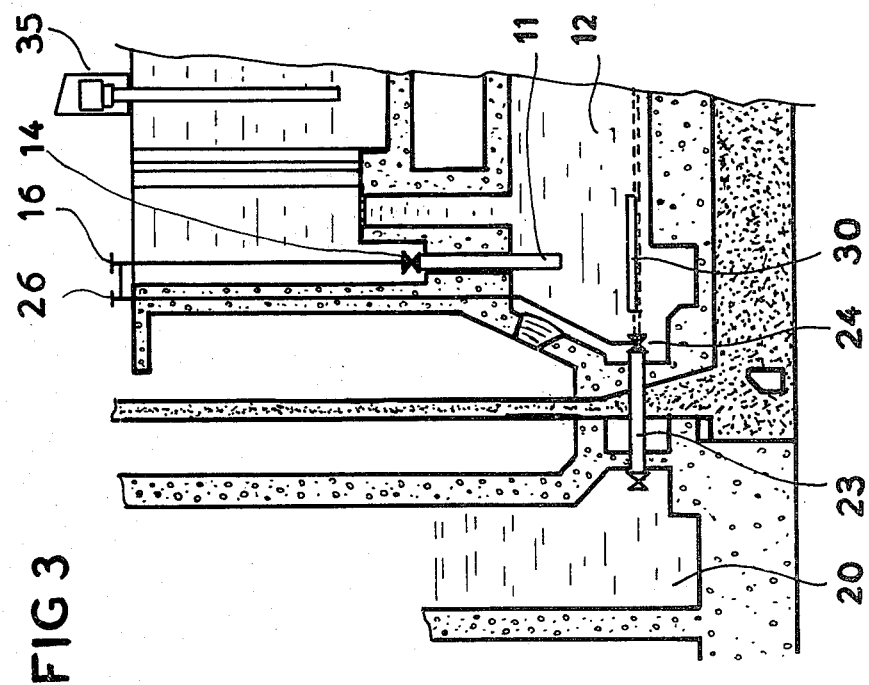

Reference will now be made principally to FIGS. 1, 3 and 4 in order to follow the sequence of operations of the transfer of a fuel unit from the swimming pool of the reactor building to the swimming pool of the fuel building. The swivel basket 30 is initially in the vertical position under the chimney 11 as shown in FIG. 1, and, with the coffers 8 and 9 not in position during fuel recharging, the same level of water is set up in all the compartments of the swimming pool of the reactor building and in particular in the removal compartment 7.

The charging machinery 35, which carries the fuel unit to be removed, is brought to a position vertically above the chimney 11, the valve 14 of which chimney has been opened beforehand by means of the control 16. The valve 24 is at this stage necessarily shut because of an interlock which will be described later. As the swivel compartment 12 is already full of water, the opening of the valve 14 does not alter the levels. The charging machinery 35 lowers the unit through the chimney 11 into the basket 30 and the telescopic tube of the machinery then rises again together with the grab. The machinery 35 now becomes available for any other handling operation in the reactor swimming pool.

In a second stage, illustrated in FIG. 3, the valve 14 is shut whilst the basket 30 is swivelled into the horizontal position. With valve 14 closed valve 24 can then be opened, establishing communications between the compartments 12 and 20.

As shown in FIG. 4, the conveyor basket 30 is moved into the fuel building through the transfer tube 23 and is then swivelled into the vertical position, vertically below the auxiliary handling machinery of the deactivation swimming pool, which machinery also serves the swivel compartment 20. This machinery, which is of the usual type, is not shown in the drawing. With the coffer 21 open, the fuel unit is thus moved, in its vertical position, to the rack of the deactivation swimming pool 19. Simultaneously the swivel basket is brought into the horizontal position and then returned through the transfer tube 23 to the compartment 12. The valve 24 can then be shut and the basket 30 swivelled into the vertical position, vertically below the chimney 11, where it awaits a new transfer cycle.

Of course the same stages are encountered in reverse order for an operation whereby fresh units are brought from storage in the swimming pool of the fuel building to the reactor swimming pool in order to charge them into the reactor.

It will be noted that the arrangement which has just been described makes it possible to work with staggered but constant water levels both in the swimming pool of the reactor building and in the swimming pool of the fuel building, because the water transferred from one building to the other represents no more than the dead spaces within the sleeve of the operating columns of the valves, which volumes are negligible compared to the volume of the swimming pools. However, this does demand rigorous interlocking of the controls of the valves 14 and 24 so as to prevent completely any possibility of their being opened simultaneously.

FIGS. 5 and 6 show an embodiment providing positive mechanical locking of the valves 14 and 24 which provides absolute security. This embodiment is given for the case where the control rod of each valve ascends or descends as it rotates, for example by rotating in a fixed nut, to cause the opening or the closing of the corresponding valve. In the locking zone, the rods 40 and 41, respectively concerned each with one of the valves, are of square cross-section and engaged in the slots 42 and 43 of a key 44 which can only be moved in translation in a direction perpendicular to the rods, as shown horizontally, between slides 45. Each of the slots 42 or 43 comprises a wide part in which the square rod can turn freely and a trapezoidal locking part. Each rod 40 and 41 possesses a zone 48 and 49 of smaller cross-section,, of trapezoidal shape, matching that of the locking part of the slot of the key. The part 48 or 49 of smaller section of the rod 40 or 41 respectively is in the horizontal plane of the key 44 only when the corresponding valve is in the shut position. As shown in FIGS. 5 and 6 it is the valve controlled by the rod 40 which is shut and the part 48 of the rod 40 is in the plane of the key, which makes it possible to move the key 44 to the left. The seating of the key round the trapezoidal section part 48 immobilizes the rod 40 and thus locks the corresponding valve in the shut position, whilst the rod 41 can rotate freely in the wide portion of the slot 43, thereby allowing any desired operation of the corresponding valve. In order to be able to operate the rod 40 to open the corresponding valve it is necessary first to bring the rod 41 to the shut position so as to be able to move the key 44 to the right and there lock it on the trapezoidal section part 49 which is then at the level of the key.

It will be noted that the bottom of the swimming pool of the fuel building is, in the present case embodiment, at the same level as the ground of the site, taken as the reference, for the reactor building, which makes it possible to achieve increased stability of the fuel building in the case of an earthquake and also makes it possible, without detracting from the stability of the building, to strengthen the concrete protection against accidental vertical fall of objects.

Of course, the invention is not intended to be strictly limited to the embodiment which has been described by way of an example but also covers embodiments which only differ therefrom in respect of details, different methods of realization or the use of equivalent means.

Thus, it is conceivable that the intermediate swivel chamber could be located in the fuel building and at the level of the swimming-pool of the reactor building. In that case, horizontal communication will be established between the reactor swimming-pool and the intermediate chamber, followed by vertical communication between the intermediate chamber and the deactivation swimming-pool which will in every case be at the level of the reference site. Such a solution, which imposes the same obligations for rigorous interlocking between the shut-off valve of the vertical chimney and the shut-off valve of the horizontal transfer tube would only maintain the intermediate chamber, of small volume, at a relatively high level; the major advantage of locating the deactivation swimming-pool of the fuel building at the reference level will still be preserved. Such a solution would be acceptable in areas of lesser risk of earthquakes, because the volume and weight of the intermediate chamber are relatively low.

What is claimed is:

1. An installation for a nuclear power station comprising:
   a reactor building containing a nuclear reactor and a first swimming pool at a level above said reactor for handling fuel units under water;
   an adjoining building with a second swimming pool for the transfer of fresh fuel units and for the storage and deactivation of spent fuel units, the bottom of said second swimming pool being at the same level as the ground of the site of said reactor building;
   an intermediate chamber in said reactor building below said first swimming pool and at the same level as said second swimming pool, said chamber being entirely and permanently filled with water;
   a horizontal pipeline and a vertical pipeline permanently filled with water, for the passage of the fuel units therethrough, and both opening into said intermediate chamber, said vertical pipeline communicating with said first swimming pool, and said horizontal pipeline communicating directly with said second swimming pool;
   a leakproof shut-off valve for each pipeline;
   interlocked control means for said valves such that said two valves cannot both be in open condition at the same time; and
   a conveyor basket for transporting said fuel units and adapted to fit inside said horizontal pipeline and said vertical pipeline with negligible dead space around said basket when inside said pipelines.

* * * * *